H. C. STEIN.
SCRAPER.
APPLICATION FILED OCT. 19, 1915.
1,198,592.
Patented Sept. 19, 1916.
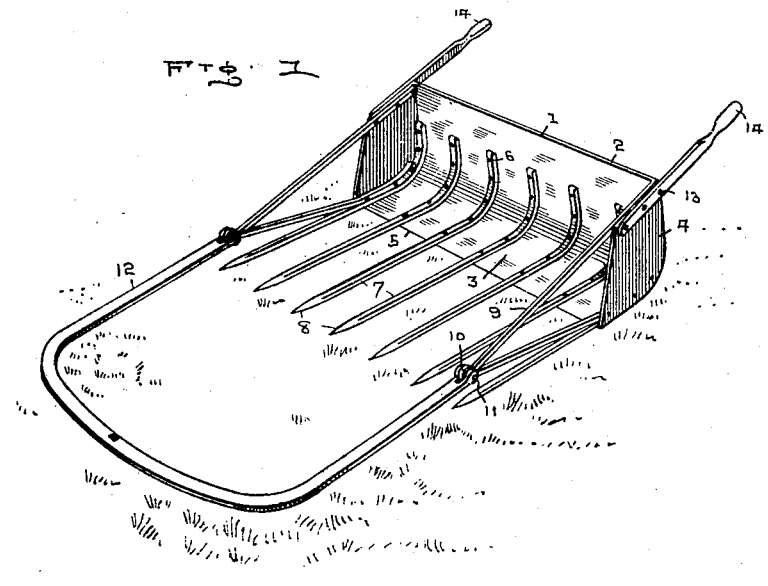
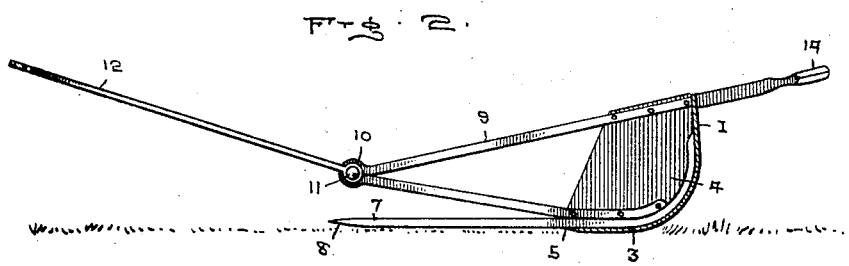

UNITED STATES PATENT OFFICE.

HERMAN C. STEIN, OF MEEK, NEBRASKA.

SCRAPER.

1,198,592.  Specification of Letters Patent.  Patented Sept. 19, 1916.

Application filed October 19, 1915. Serial No. 56,751.

*To all whom it may concern:*

Be it known that I, HERMAN C. STEIN, a citizen of the United States, residing at Meek, in the county of Holt and State of Nebraska, have invented certain new and useful Improvements in Scrapers; and I do hereby declare the following to be a full, clear, and exact description of the invention, such as will enable others skilled in the art to which it appertains to make and use the same.

My invention relates to new and useful improvements in scrapers and more particularly to that class employed for gathering manure, trash and like substances, and my object is to provide a metallic body or scoop having a forward cutting edge and also having a plurality of tines projecting forwardly therefrom.

A further object is to provide means for attaching a draft animal to the scraper. And a further object is to provide suitable handles for controlling the scraper.

Other objects and advantages will be hereinafter set forth and more particularly pointed out in the accompanying specification.

In the accompanying drawings which are made a part of this application, Figure 1 is a perspective view of the scraper complete, and Fig. 2 is a vertical transverse sectional view thereof.

Referring to the drawings in which similar reference numerals designate corresponding parts throughout the several views, 1 indicates the body of the scraper which is preferably constructed of sheet steel, said body comprising a rear wall 2, a bottom wall 3 and end walls 4, all of said parts being stamped from one piece of material, the forward edge of the bottom wall 3 being tapered to form a knife or cutting edge 5 so that when the body is dragged forwardly it will cut its way through the substance being gathered.

Attached to the rear and bottom walls of the body by means of rivets 6 or the like, and extending forwardly of the cutting edge 5 are tines 7 which are spaced a uniform distance apart, the free ends 8 of the tines being preferably tapered to a point so that they will readily enter the substance being scraped and by extending the tines a suitable distance beyond the cutting edge 5, a larger amount of the substance can be removed by the scraper than when an ordinary scraper is used.

Attached to the end walls 4 and projecting forwardly therefrom are bars 9, said bars comprising upper and lower sections which extend at an angle forwardly and being secured together at their outer ends and formed into sockets 10 to which are pivotally secured the bifurcated ends 11 of a clevis 12 and as said bars are preferably formed of one piece of material and extended at an angle from each other, the parts of the body of the scraper are suitably braced against undue strain.

Attached to the end walls 4 by means of rivets or bolts 13 are handles 14 by means of which the action of the scraper may be readily controlled.

The inner ends of the handles 14 are extended over the outer face of the end walls and in registration with the inner ends of the upper sections of the bars 9, the upper edges of the handles being flush with the upper edges of the side walls and as said bar sections and handles are on opposite sides of the end walls, said end walls will be protected from injury when the scoop is dumped to empty the contents thereof, the upper edges of the end walls in this instance striking against the clevis.

In view of the simplicity of this device, it can be very cheaply constructed and as the parts thereof are preferably formed of metal, it will be very strong and durable, and it will likewise be seen that by extending the tines forwardly of the body portion of the scraper, the capacity of the scraper will be greatly increased without adding to the weight of the scraper.

Having thus fully described my invention what I claim as new and desire to secure by Letters Patent of the United States, is:—

A scraper comprising a body portion having a bottom, rear wall, and end walls, all of said walls being formed in one section, bars at each end of the body, said bars comprising an upper and lower section formed of one piece of material and bent over at their outer ends to form sockets, the inner ends of the upper sections being extended along the entire width of the inner faces of the end walls and having their upper edges substantially flush with the upper edges of the end walls, the inner ends of the lower sections being bent to conform to the shape of the bottom wall, the side faces of said bars being flat to provide broad and close contact with the faces of the end walls, said sections of the bars being flared away from each other from the sockets to their inner ends, means to attach the bars to the end walls, a clevis pivoted to said sockets and handles attached to the outer faces of the end walls and in registration with said upper sections of the bars, said handles having their upper edges flush with the upper edges of said walls, said upper bar sections and said handles forming reinforcements and guards for the upper edges of said end walls.

In testimony whereof I have signed my name to this specification in the presence of two subscribing witnesses.

HERMAN C. STEIN.

Witnesses:
NELLIE B. SPINDLER,
ELBERTA SPINDLER.

Copies of this patent may be obtained for five cents each, by addressing the "Commissioner of Patents. Washington, D. C."